United States Patent [19]

Koga et al.

[11] Patent Number: 5,015,444
[45] Date of Patent: May 14, 1991

[54] PLATE TYPE REFORMER

[75] Inventors: Minoru Koga, Kawasaki; Takenori Watanabe, Ichikawa, both of Japan

[73] Assignee: Ishikawajima-Harima Heavy Industries Co., Ltd., Tokyo, Japan

[21] Appl. No.: 243,334

[22] Filed: Sep. 9, 1988

[30] Foreign Application Priority Data

Sep. 25, 1987 [JP] Japan ............................ 62-145404[U]

[51] Int. Cl.$^5$ .............................................. B01J 8/02
[52] U.S. Cl. .................................... 422/195; 422/191; 48/94
[58] Field of Search ................... 422/191, 195; 48/94, 48/196 A, 214 A; 252/373

[56] References Cited

U.S. PATENT DOCUMENTS

| 3,338,681 | 8/1967 | Kordesch | 422/240 X |
| 3,909,299 | 9/1975 | Corrigan | 48/94 X |
| 4,302,292 | 11/1981 | Waclawiczek | 422/199 X |
| 4,504,447 | 3/1985 | Spurrier et al. | 422/202 X |
| 4,714,593 | 12/1987 | Naito et al. | 422/197 |

FOREIGN PATENT DOCUMENTS

| 2027305 | 2/1987 | Japan | 422/191 |
| 160134 | 7/1987 | Japan . | |
| 160135 | 7/1987 | Japan . | |
| 160136 | 7/1987 | Japan . | |

Primary Examiner—Robert J. Warden
Assistant Examiner—D. John Griffith, Jr.
Attorney, Agent, or Firm—R. A. Blackstone, Jr.

[57] ABSTRACT

Main units which includes a reforming reactor and a combustor, both piled together having a heat conductive, partition wall therebetween, are located in a manner such that the combustor sides thereof face each other, with an auxiliary unit for supplying fuel to each combustor being put between the main units. Raw material gas to be reformed is supplied to the reforming reactor through a passage formed in each unit, and then discharged through another passage formed in each unit. Fuel is supplied to the auxiliary unit through yet another passage formed in the main unit, so that it may flow uniformly dispersing in the combustor via the auxiliary unit.

8 Claims, 3 Drawing Sheets

PLATE TYPE REFORMER

BACKGROUND OF THE INVENTION

1. Technical Field

This invention relates to a reformer in which fuel gas (raw material gas) is reformed to product gas and supplied to anodes (fuel electrodes) of cells in fuel cell systems, in particular, relates to a plate type reformer in which reforming reaction is conducted while the fuel gas is indirectly heated by burning gas which is supplied to cathodes (air electrodes) of the cells.

2. Background Art

A fuel cell system is an electricity generating system using reversed electro-chemical reaction of an electrolysis of water in electrolytes including carbonates, phosphates, etc. with hydrogen gas being supplied to an anodes (fuel electrodes) and buring gas ($O_2$, $CO_2$) to a cathodes (air electrodes) in the cells.

The hydrogen gas, which is supplied to the anode, is obtained by supplying fuel gas, such as methane as raw material gas with steam to the reformer, in accordance with reforming reaction which is given by the following chemical equations with use of catalysts.

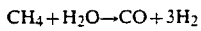

$CH_4 + H_2O \rightarrow CO + 3H_2$

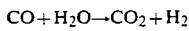

$CO + H_2O \rightarrow CO_2 + H_2$

To maintain reforming temperature in the reformer, remaining hydrogen or carbon monoxide in the anode gas is supplied into the reformer and burned there to heat up indirectly the fuel gas to be reformed.

In such a reformer, however, air and fuel flow into a combustor of the reformer to be burned together, so that volume of the combustor has to be large, and the reformer is often too large in size. Temperature of burned gas was as high as 1300 degrees C. until heat was transferred to the reforming gas and it is structurally impossible to decrease temperature of the burnt gas in order to match temperature of heat receiving gas (between 550 and 750 degrees C.).

To solve these problems, plate type reformers which are compact in size, and in which uniform combustion all over the combustor is possible to achieve effective reforming were recently proposed (for example, Japanese Patent Application Laid Open No. Sho. 62-160136 (160136/1987).

SUMMARY OF THE INVENTION

A primary object of this invention is to provide a plate type reformer which enables effective heat exchanging between burning gas and raw material gas to be reformed.

Another object of this invention is to provide a plate type reformer which is capable of suppressing combustion temperature when fuel gas is burned with air in the combustor.

A further object of this invention is to provide a plate type reformer which enables uniform fuel supply to the combustor as well as step-by-step combustion.

This invention provides a plate type reformer comprising plural main units which include a combustor filled with combustion catalyst and a reforming reactor filled with reforming catalyst, piled together putting a heat conductive separator between the combustor and the reactor, and plural auxiliary units to supply fuel to the combustors of respective main units.

Further this invention provides a plate type reformer in which each combustor-side surface of a main unit faces each other, sandwiching an auxiliary unit therebetween, thus the main units and the auxiliary unit are piled together, and this pile has a passage to supply air for combustion to the above mentioned combustor, a passage to exhaust out burnt gas from the combustor, a passage to supply raw material gas to be reformed into reforming reactor, a passage to draw off reformed gas, and a passage to supply fuel to the above mentioned distance plate.

DESCRIPTION OF THE PREFERRED EMBODIMENTS

Figure 1:
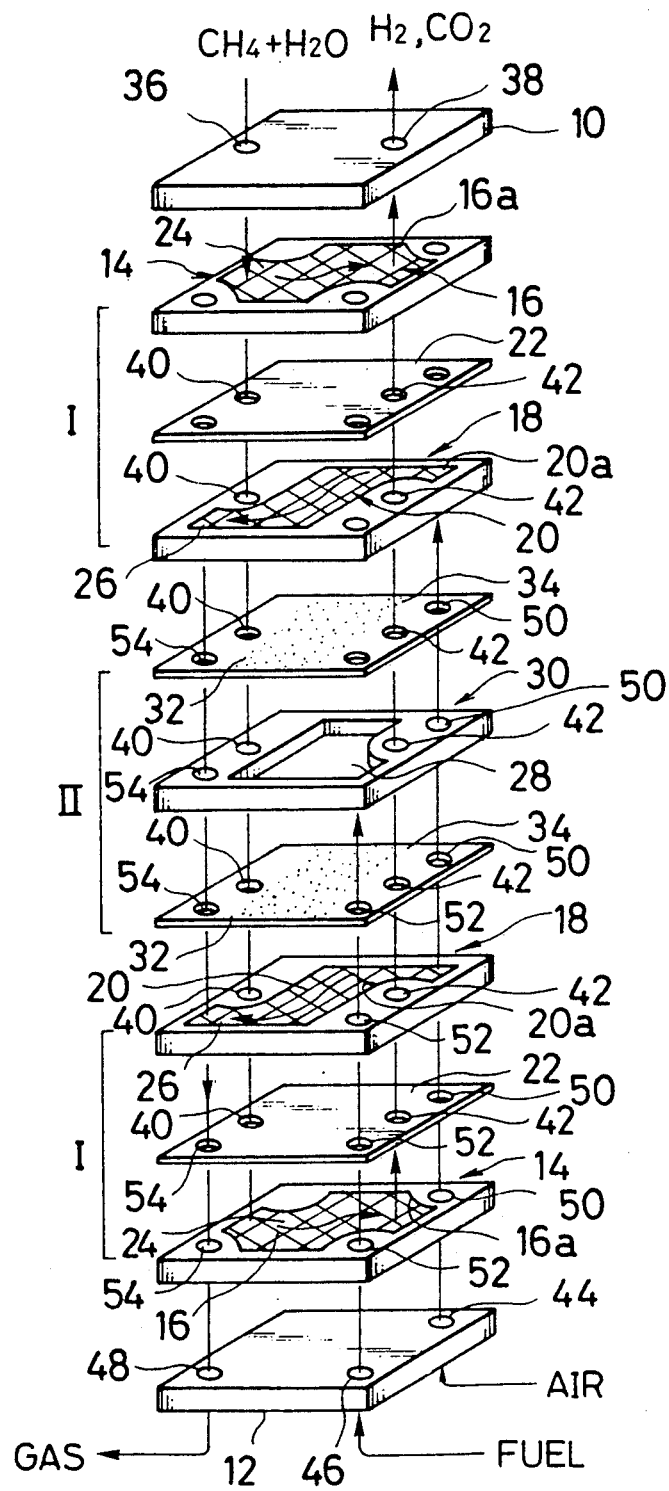
FIG. 1 is a perspective view showing a part of an embodiment of this invention prior to assembling thereof.
Figure 2:
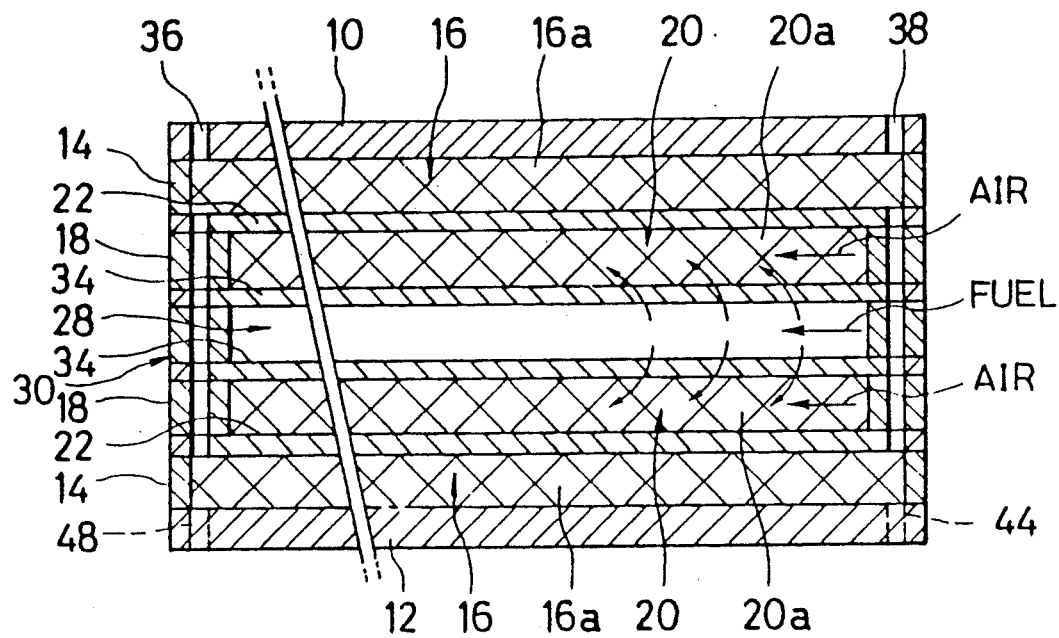
FIG. 2 is a cross sectional view of FIG. 1 as assembled.

As described in FIG. 1 and FIG. 2, a single segment of a plate type reformer of this invention mainly comprises two main units I, in which reforming reaction and combustion take place, and one auxiliary unit II, through which fuel for combustion is supplied to the main units I, with the auxiliary unit sandwiched by the main units I, and the main units being symmetrical to each other. Holders 10 and 12 are located on the exposed sides of the main units I, respectively.

The main unit I includes a reforming plate 14 in which a reforming reactor 16 is formed, a combustion plate 18 in which a combustor 20 is formed, and a heat conductive separator or a heat conductive partition wall 22 located between two plates 14 and 18. Central portion of the reforming plate 14 is hollowed out and the hollow or space 16a is filled with reforming catalyst 24, so as to form the reforming reactor 16. Similarly to the reforming plate, central portion of the combustion plate 18 is hollowed out, and the hollow 20a defined within the combustion plate 18 is filled with combustion catalyst 26, so as to form the combustor 20.

The auxiliary unit II comprises of a distance plate 30 which has a scooped space 28, and two dispersion plates 34 which have many pores 32 to supply fuel from the scooped space 28 to the combustors 20 in the main units I, with the dispersion plates being stacked onto the distance plate.

In the pile of these main units I and the auxiliary unit II, the combustion plates 18 of the main units I are located to contact with the upper and lower dispersion plates 34 of the auxiliary unit II respectively, with the upper holder 10 and the lower holder 12 for the sandwich of the main unit I, the auxiliary unit II, and the main unit I being fastened by bolts and nuts, or the like (not shown).

The upper holder 10 has an inlet opening 35 for raw material gas to be reformed ($CH_4 + H_2O$), and an outlet opening 38 for the reformed gas ($H_2$, $CO_2$). The inlet 36 communicates with the reforming reactor 16 in the reforming plate 14 located thereunder, and the raw material gas to be reformed is supplied to the reforming reactor 16 in the lower main unit 1 through bores 40 formed within the partition plate 22, the combustion plate 18, the dispersion plate 34, and the distance plate 30. The gas so reformed flows through openings 42 formed within the partition plate 22, the combustion plate 18, the dispersion plate 34, and the distance plate 30 so that it encounters the gas reformed in the reforming reactor 16 in the upper main unit I and proceeds to the outlet opening 38 at the upper holder 10.

The lower holder 12 has an air inlet 44, a fuel inlet 46, and a burnt gas outlet 48. Air through the air inlet 44 is supplied to the combustion chamber 20 in the combustion plate 18 through openings 50 bored within the reforming plate 14 and the separator 22 of the lower main unit I, and then from that combustion chamber 20 the air is supplied to another combustion chamber 20 in the upper main unit I through openings 50 of the upper and lower dispersion plates 34 and the distance plate 30.

Fuel through the fuel inlet 46 is supplied tot he scooped space 28 of the distance plate 30 via openings 52 bored within the reforming plate 14, the partition plate 22, the combustion plate 18, and the dispersion plate 34 of the main unit I.

Exhaust gas generated in the combustor 20 in the upper main unit I flows through holes 54 formed in the dispersion plate 34 and the distance plate 30 and encounters the exhaust gas generated upon combustion in the combustion chamber 20 of the lower main unit I. After that, those exhaust gases are discharged from an exhaust opening 48 through holes 54 made in the partition plate 22 and the reforming plate 14.

In the above mentioned system, air is supplied from the air inlet 44 while fuel is supplied from the fuel inlet 46 in the lower holder 12, and raw material gas to be reformed ($CH_4 + H_2O$) is supplied from the gas inlet 36 in the upper holder 10.

Air flows from the air inlet 44 through the holes 50 into the combustors 20 in the upper and lower main unit I. Fuel flows into the scooped space 28 in the distance plate 30 from the fuel inlet 46 of the lower holder 12 through the fuel passage 52 of the main unit I, and then the fuel flows out of the scooped space 28, proceeding through the pores 32 of the upper and lower dispersion plates 34 into the upper and lower combustors 20 next to the dispersion plates 34. The fuel is burned with the combustion catalyst 26 in the combustors 20, the resulting exhaust gas is discharged from the exhaust gas outlet 48 of the holder 12 through the holes 54.

On the other hand, raw material gas to be reformed supplied from the inlet 36 of the upper holder 10 flows into the reforming reactor 16 of the upper main unit I, and a part of the gas further flows into the reforming reactor 16 of the lower main unit I through the holes 40. This fuel gas is heated by the gas which has been burned in the combustor 20 and reaches the reaction chamber 16 through the separator 22, and reformed to $H_2$ and $CO_2$ with the reforming catalyst 26 in the reforming chamber 16. The gas thusly reformed is delivered outside the unit from the reformed gas outlet 38 of the upper holder 10 via the openings 42.

In the reforming process mentioned above, this system can be made compact because the reforming reactor 16 is located adjacent to the combustor 20 with the separator 22 disposed between the reforming reactor 16 and the combustor 20 so that the reforming reactor 16 may be heated up by the burned gas generated in the combustor 20.

Since the fuel flows through the scooped space 28 of the distance plate 30 and the pores 32 of the dispersion plate 34, it spreads uniformly throughout the combustor 20, combustion of the fuel takes place gradually or step by step, lowering the combustion temperature compared with conventional systems. It is possible to adjust the combustion temperature required by the heat receiving gas, by controlling size and pitch of the pores 32 in the dispersion plate 34.

Figure 3:
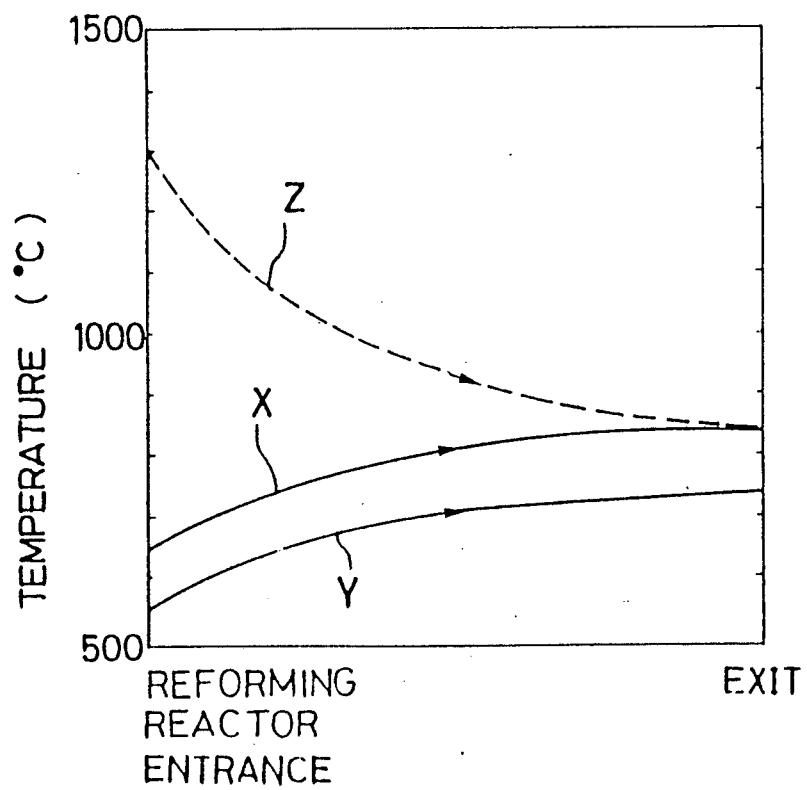
FIG. 3 and FIG. 4 illustrate temperature distributions of combustion gas and reforming gas between the inlet and the outlet of reforming reactor during heat-exchange, respectively.
Figure 4:
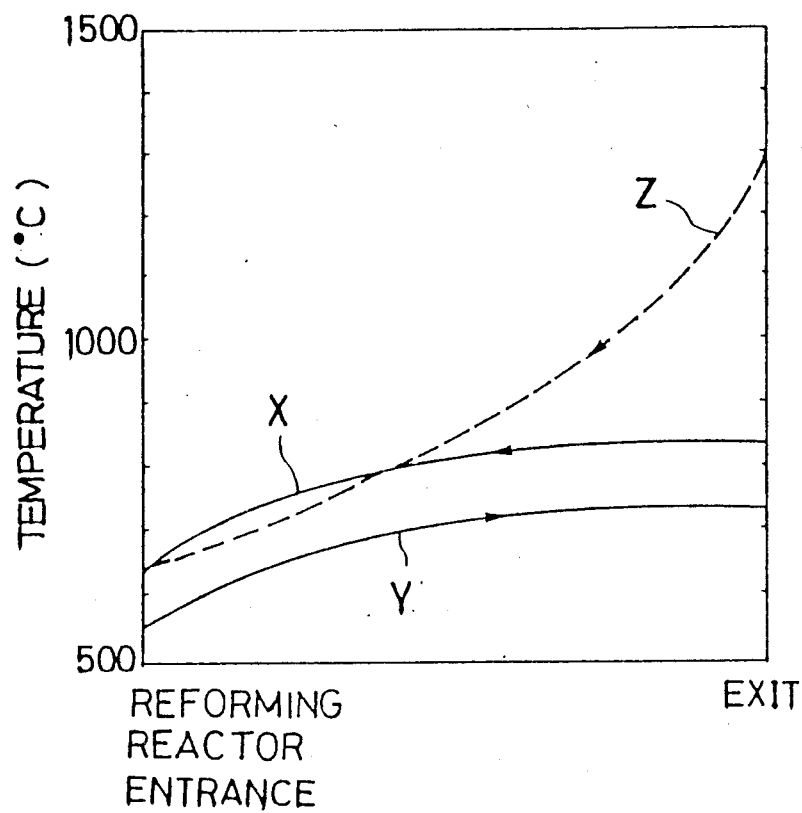

FIG. 3 and FIG. 4 depict temperature distribution curves of burnt gas and heat-receiving reformed gas between the entrance and the exit of reforming reactor, in which "X" indicates a temperature distribution curve of combusted gas, and "Y" indicates the distribution curve of the reformed gas according to the present invention while "Z" is the temperature distribution curve of the combusted gas in a conventional system. FIG. 3 depicts distribution curves of the case where heat exchange of combusted gas and heat receiving (reforming) gas are performed by parallel gas flow (co-flow), and FIG. 4 depicts the case of counter flow. As indicated by the curve Z, the temperature of the combusted gas in the conventional system is as high as 1300° C. (degrees C.) at the entrance while according to the present invention, burned gas temperature is 650° C. at the entrance and 850° C. at the exit as illustrated by the temperature distribution curve X. This means that lowering of temperature can be accomplished by the present invention.

Figure 5:
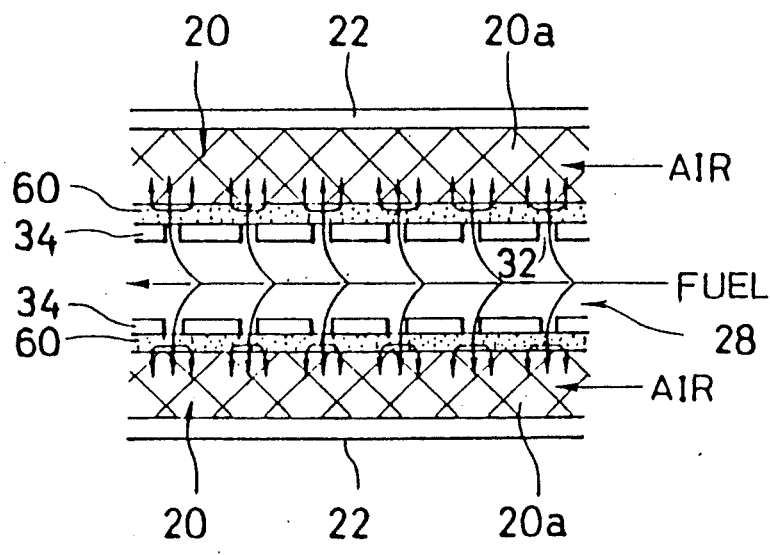
FIG. 5 is a sectional view of another embodiment at the central part according to this invention.

FIG. 5 shows another embodiment of this invention. This embodiment, basically identical to the reforming system illustrated in FIGS. 1 and 2, further includes two porous plates 60, each mounted on the combustor 20 side dispersion plate 34. In this embodiment, function of each porous plate 60 is to further disperse the fuel flowing into the combstom 20 through the pores 32 of the dispersion plate 34. In other words, when the size and pitch of the pores 32 in the dispersion plate 34 are determined in a manner such that fluctuation of the fuel pressure may not affect on reforming reaction, the pitch has to be considerably large, and therefore uniform fuel dispersion is difficult to realize. For such a case, the porous plate 60 effectively serves to make the fuel much finer.

It is recognized, of course, that those skilled in the art may make various modifications or additions to the preferred embodiments without departing from the scope of the present invention and that the present invention is not limited to those embodiments. For instance, positions of the passages for air, fuel, etc and each inlet/outlet opening for fuel, reformed gas etc., may be changed from the positions shown in the figures. Also, the numbers of layers of the main unit may be more than two, and in accordance with increased layers, number of auxiliary unit will be increased.

What is claimed is:

1. A plate type reformer, comprising:
a plurality of main units, each main unit including a combustor filled with combustion catalyst and a reforming reactor filled with reforming catalyst with a heat conductive partition wall being sandwiched between the combustor and the reforming reactor;
an auxiliary unit including: a fuel plate which has a vacant fuel chamber; and two porous plates sandwiching the fuel plate, the porous plates serving as fuel distribution plates for uniformly supplying he fuel into each combustor of each main unit, whereby the reforming reactors of the main units are equally heated, the combustors of the main units facing each other so as to sandwich the auxiliary unit between the combustion of the main units;

an air passage for supplying air to said combustor;

an exhaust passage for discharging gas burned in said combustor;

a fuel gas passage for supplying fuel gas for reforming to the reforming reactor;

a gas discharge passage for discharging the gas which is reformed; and a fuel passage for supplying the fuel to said fuel chamber, all the passages being formed within the main and auxiliary units.

2. The reformer of claim 1, wherein the auxiliary unit has two faces and the main unit has two faces, and one of the main units is located on one face of the auxiliary unit and another of the main units is located on the other face of the auxiliary unit in such a way that the combustor of each main unit faces the auxiliary unit, and wherein two holders are provided on those faces of the main units that do not face the auxiliary unit respectively so that all the units between the holders are piled together as a single element.

3. The reformer of claim 1, wherein the main unit includes a reforming plate in which the reforming reactor is formed, a combustion plate in which the combustor is formed, and a heat conductive partition plate which is sandwiched between the reforming plate and the combustion plate.

4. The reformer of claim 3, wherein the reforming reactor includes a reforming plate which is hollowed out at the center thereof so as to define a hollowed space with the hollowed space being filled with the reforming catalyst.

5. The reformer of claim 3, wherein the combustor includes the combustion plate whose central portion is hollowed out to define a hollowed space, with the hollowed space being filled with the combustion catalyst.

6. The reformer of claim 1, wherein the main unit includes a reforming plate in which the reforming reactor is formed, a combustion plate in which the combustor or a combustion chamber is formed, and a heat conductive partition wall which is sandwiched between the reforming plate and the combustion plate, the main unit being stacked in a manner such that the combustor of the main unit may be located adjacent to the distribution plate, and a holder is mounted onto the main unit so that all the units may be piled as a single element.

7. The reformer of claim 6, wherein a raw material gas inlet to supply raw material gas to be reformed into the reforming reactor and a reformed gas outlet to discharge the reformed gas are formed in one holder, and supply and discharge passages for raw material gas to be reformed and the reformed gas are formed in the heat conductive partition wall, the combustion plate, and the fuel plate and the distribution plates of the auxiliary unit.

8. The reformer of claim 6, wherein inlet openings for combustion air and fuel gas, and an outlet opening for the combusted gas are formed in the holder, a supply passage for combustion air and a discharge passage for exhaust gas are formed in the heat conductive partition wall, the reforming plate, and the fuel plate and the distribution plates of the auxiliary unit, and a supply passage is formed in the combustion plate, the heat conductive partition wall, the reforming plate, and the distribution plates of the auxiliary unit, so as to allow for the fuel gas to flow into the fuel chamber of the fuel plate.

* * * * *